Nov. 1, 1955    N. A. NELSON    2,722,450
PIPE ELEVATOR
Filed March 4, 1954    2 Sheets-Sheet 1
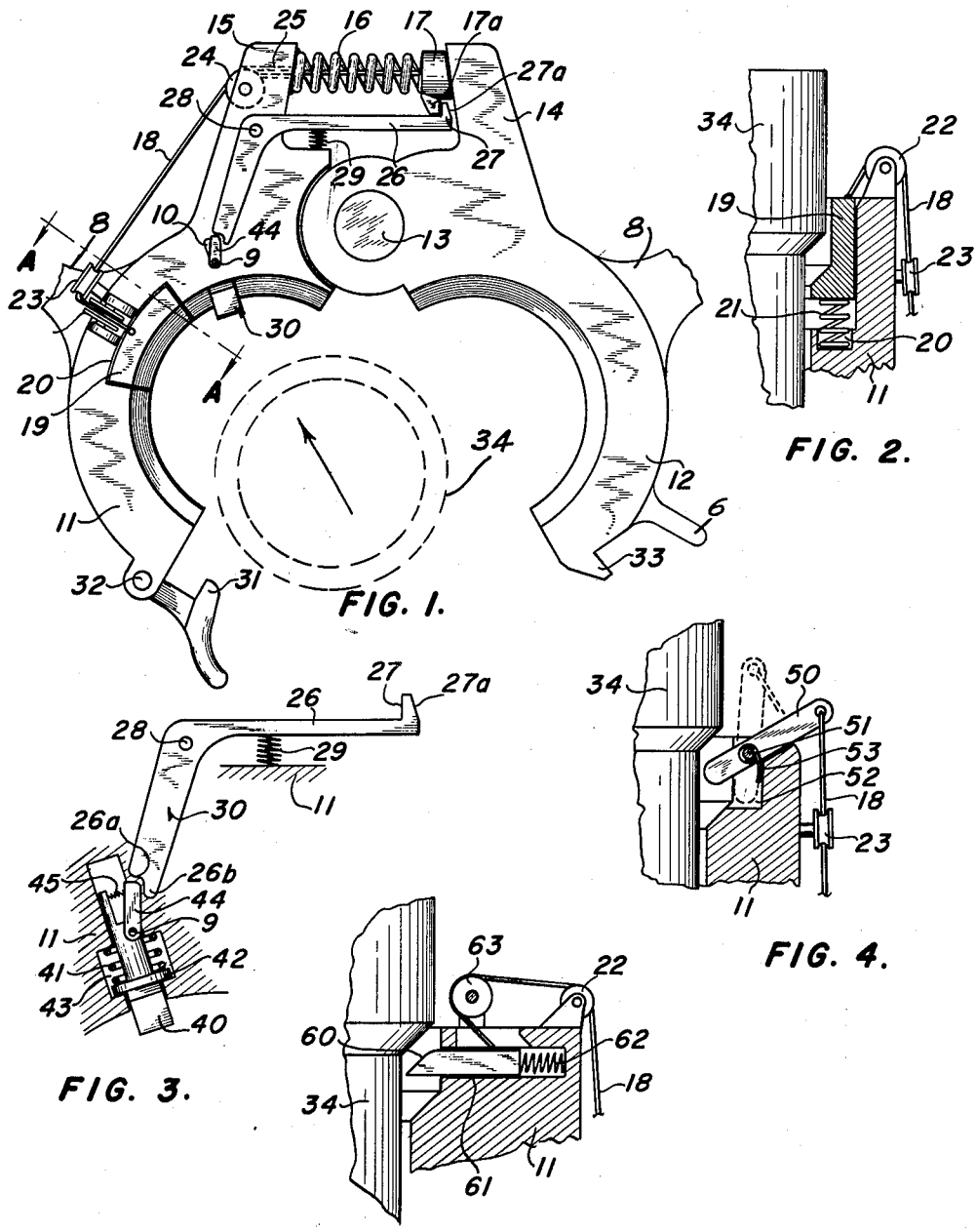
INVENTOR.
Norman A. Nelson,
BY
ATTORNEY.

Nov. 1, 1955     N. A. NELSON     2,722,450
PIPE ELEVATOR
Filed March 4, 1954     2 Sheets-Sheet 2
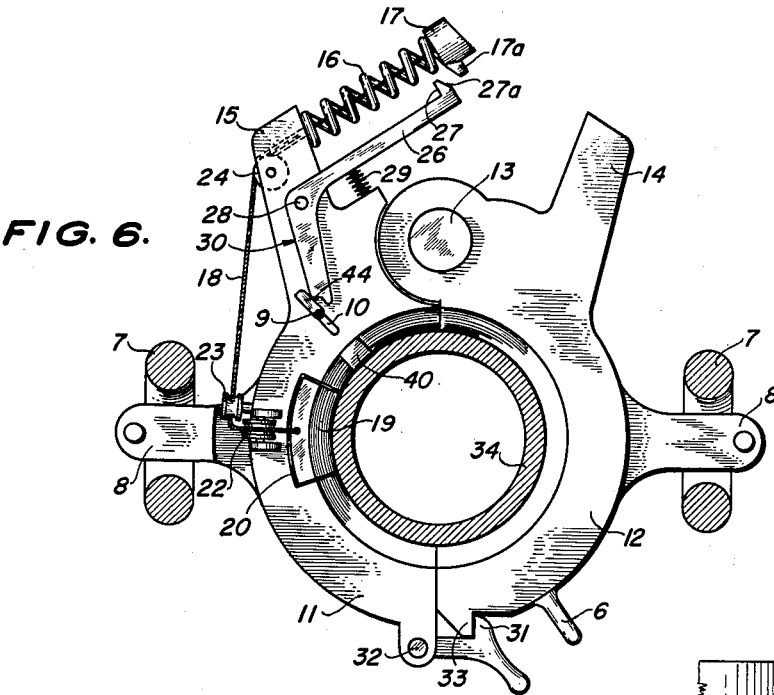
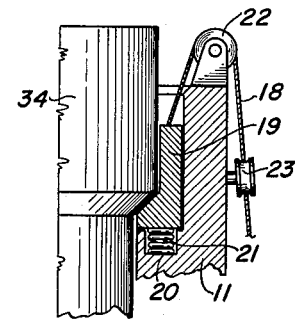
FIG. 8.
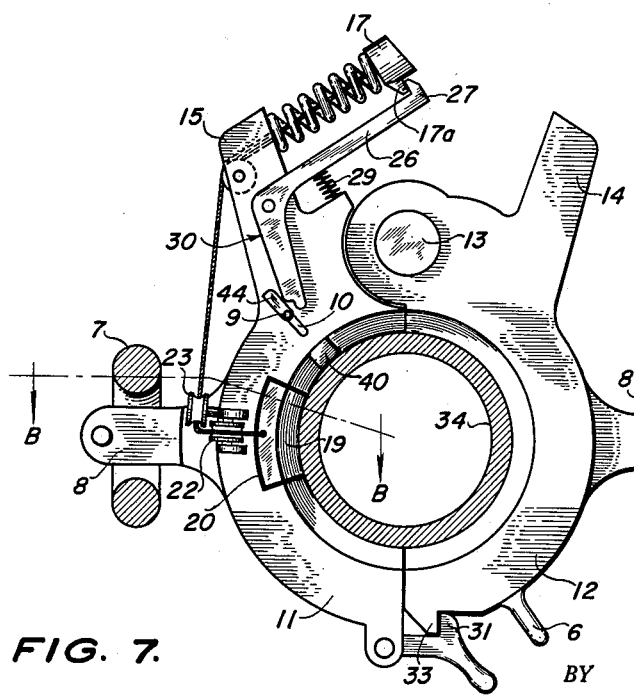
INVENTOR.
Norman A. Nelson,
BY
ATTORNEY.

United States Patent Office 2,722,450
Patented Nov. 1, 1955

2,722,450

PIPE ELEVATOR

Norman A. Nelson, Houston, Tex., assignor, by mesne assignments, to Esso Research and Engineering Company, Elizabeth, N. J., a corporation of Delaware Application March 4, 1954, Serial No. 413,983

7 Claims. (Cl. 294—110)

The present invention is directed to a pipe elevator. More particularly, the invention is directed to apparatus to be used for elevating pipe stands in the drilling of oil and gas wells and the like.

This application is a continuation-in-part of Serial No. 263,081, filed December 24, 1951, now abandoned, entitled "Pipe Elevator" for Norman A. Nelson.

The present invention may be described briefly as involving a pipe elevator which includes a pair of pivotally interconnected body members adapted to encircle, when closed, the periphery of a pipe. The body members are provided with projecting outward shoulders adjacent the point where they are pivotally connected. Arranged between the projecting outer shoulders outside of the normal encirclement of the area of the pipe elevators is a compression means which normally urges the body members into a closed position. On one of the body members is an actuating means operatively connected to the compression means for compressing same and adapted to be actuated by the weight of said pipe when picked up by the elevator. A latching means is arranged between the shoulders for holding the compression means under compression and a trigger mechanism is arranged on one of the body members for releasing the latching means and adapted to be tripped on contact with the periphery of the pipe.

The present invention will be more particularly illustrated by reference to the drawing in which Fig. 1 is a view looking downward on a pipe elevator in accordance with the present invention;

Fig. 2 is a view taken along lines A—A of Fig. 1;

Fig. 3 is a detail of the trigger mechanism and its allied parts;

Fig. 4 is a modified embodiment of my invention employing a lever instead of a piston as shown in Figs. 1 and 2; and Fig. 5 is a similar modification showing a wedge used in lieu of the pistons shown in Figs. 1 and 2.

Fig. 6 is a view similar to Fig. 1 showing the pipe elevator in closed position about a pipe.

Fig. 7 is a view similar to Fig. 6 showing the pipe elevator in spring-compressed pipe pickup position.

Fig. 8 is a sectional view taken along section B—B of Fig. 7.

Referring now to the drawing numerals 11 and 12 designate a pair of interconnected elevator body members which are pivotally connected by pivot 13. The body members 11 and 12 have projecting shoulders 15 and 14, respectively, between which is arranged a compression means such as spring 16 having one end attached by means such as welding to shoulder 15 and which is adapted to be compressed by a plate 17 to which is connected a cable or wire line 18. The elevator body is provided with bails 7 connected to lugs 8 positioned on body members 11 and 12. The bails are employed in supporting and maneuvering the pipe elevator into contact with pipe 34 as indicated in Fig. 1 by the dotted lines. Also, a handle 6 may be provided on body member 12 to aid in swinging open the elevator.

Arranged in body member 11 is a spring loaded pressure plate or piston 19 which fits into a recess 20. The pressure plate or piston 19 is normally urged upwardly by a spring or other compression means 21 arranged in recess 20. Cable or wire line 18 is connected to pressure plate or piston 19 which passes over a first pulley 22 attached to the body member 12 and a second pulley 23 which similarly is attached to the body member 12. The cable passes over a third pulley 24 and thence through an opening 25 in the shoulder 15.

Arranged between the shoulders 14 and 15 is a spring loaded trip or generally L-shaped latch arm 26 which is adapted to engage with plate 17 by latch 27. The spring loaded trip arm is pivoted by pin 28 and is normally urged in an upward position by spring 29. The spring loaded trip arm 26 is adapted to contact a trigger mechanism generally indicated as 30 but described in more detail in Fig. 3. The body member 12 is provided with a latch member 31 which is pivotally attached at pivot 32 to the body member 12, the body member 11 being provided with a shoulder 33 which is engageable with the latch 31 to close body members 11 and 12 to encircle the periphery of a pipe, such as pipe 34.

Referring again to Fig. 1 and to Fig. 3, the trigger 40 of the trigger mechanism 30 is adapted to be compressed inwardly by engagement with the periphery of pipe 34 but is normally urged outwardly by a spring 41 encircling the trigger 40 and bearing against an annular shoulder 42 and bearing also against one end of the recess 43 in body member 12. The trigger 40 has an arm 44 pivoted on pin 9 in slot 10 which is urged outwardly by a spring 45 to allow the arm 44 to contact the spring loaded trip arm 26 when the trigger 40 is compressed inwardly. Trigger arm 44 is arranged in operative relationship to trip arm 26 to engage the notch 26a and to be forced to the left on pivotal movement of arm 26 about pin 28 by finger 26b. It is to be noted that latch 27 is provided with a tapered or machined surface 27a to allow for engagement with projection 17a of plate 17 as will be described.

Referring now to Fig. 4 it will be seen that the pressure plate or piston 19 is replaced by a lever arm 50 which is pivotally attached at pivot 51 to the body member 12 and is arranged to pivot in a recess 52. The lever arm is normally urged upwardly by a tension spring 53 and is connected to cable 18 which passes over pulley 23 as has been shown.

The device of Fig. 5 is similar to that of Figs. 1 to 4 but differs therefrom in that a wedge member 60 is arranged in a recess 61 of the body member 12. This wedge member is normally urged outwardly by a return spring 62 arranged in the recess 61. Connected to the wedge member 60 is cable 18 which passes over pulleys 63 and 22 and thence connected to the plate 17 as has been described.

The apparatus of the present invention operates in the following manner: When it is desired to pick up a stand of pipe the elevator, supported by bails 7, is swung into the stand of pipe 34. As the elevator engages the stand of pipe 34 the trigger 40 is compressed inwardly causing arm 44 to bear against the notch 26a and urge the trip arm 26 in a pivotal motion around pin 28. Motion of arm 26 before the weight of pipe 34 is picked up by the elevator causes the finger 26b to contact the arm 44 moving it inwardly to compress spring 45 and finally releasing notch 26a completely from contact with the trip arm 26 as the arm 44 pivots to the left. Pivotal motion of arm 26 during this operation is transmitted in the linkage and latch 27 is moved downwardly to release projection 17a of plate 17 permitting expansion of the spring 16 to cause the elevator to close and be latched as shown in Fig. 6. Thereafter, the arm 26 returns to its normal position by force of spring 29. As the weight of the pipe 34 is picked up or borne by the elevator, piston or pressure plate 19 is depressed as shown in Fig. 8 which movement is transmitted through cable or wire line 18. Movement of cable 18 recompresses the spring 16 which, in its compression movement, causes projection 17a on plate 17 to contact the tapered or machined surface 27a on latch 27 to effect downward movement of the latch 27 pivoting around the pin 28. As the spring 16 is further compressed, the plate 17 moves slidably over surface 27a and expansion of spring 29 moves the latch 27 pivotally around pin 28 and then engages the projection 17a of plate 17 in a locked condition as shown in Fig. 7. During this interval in which the spring 16 is compressed for subsequent usage, the trigger mechanism 30 is in an inactive condition being retained in the chamber 43 provided for it by contact with pipe 34. When the elevator is disengaged from the pipe 34, spring 41 expands to return the trigger mechanism 30 to the ready position with spring 45 expanded and arm 44 positioned to reengage the trip arm 26 as trigger 40 is contacted by the pipe 34 as previously described. This puts the elevator mechanism in a cocked position.

When the elevator is latched about the pipe 34, the spring 16 is expanded and is in an unlatched condition. The sequence of events described above, takes place as the pipe 34 bears against trigger mechanism 30 and when weight is picked up by the elevators compressing pressure plate 19.

While a pressure plate or piston member, a wedge member and a lever arm have been shown, it is to be understood that other mechanical equivalents may be used therefor such as a hydraulic device or gear arrangements.

The nature and objects of the present invention having been completely described and illustrated, what I wish to claim as new and useful and to secure by Letters Patent is:

1. In a pipe elevator embodying a pair of pivoted interconnected body members adapted to encircle, when closed, the periphery of a pipe, a projecting outer shoulder adjacently arranged on each of said body members, compression means arranged between said projecting outer shoulders normally urging said members into a closed position, actuating means arranged on one of said body members operatively connected to said compression means for compressing same on picking up weight of said pipe in said elevator, latching means arranged between said shoulders normally holding said compression means under compression, and a trigger arranged on said body member normally urged in inoperative relationship to said latching means for releasing said latching means and adapted to trip said latching means on contact of said trigger with the periphery of said pipe.

2. A pipe elevator in accordance with claim 1 in which the actuating means is a pressure plate member.

3. A pipe elevator in accordance with claim 1 in which the actuating means is a lever member.

4. A pipe elevator in accordance with claim 1 in which the actuating means is a wedge member.

5. In a pipe elevator embodying a pair of pivoted interconnected body members adapted to encircle, when closed, the periphery of a pipe, a projecting outer shoulder adjacently arranged on each of said body members, compression means arranged between said projecting outer shoulders on each of said body members normally urging said members into a closed position, a spring loaded pressure plate member arranged on one of said body members connected by a flexible member to said compression means for compressing same on picking up weight of said pipe on said elevator, latching means arranged between said shoulders normally holding said compression means under compression, and a trigger arranged on said body member normally urged in inoperative relationship to said latching means for releasing said latching means and adapted to trip said latching means on contact of said trigger with the periphery of said pipe.

6. In a pipe elevator embodying a pair of pivoted interconnected body members adapted to encircle, when closed, the periphery of a pipe, a projecting outer shoulder adjacently arranged on each of said body members, compression means arranged between the projecting outer shoulders on each of said body members normally urging said members into a closed position, a spring loaded pressure plate member arranged on one of said body members connected by a flexible member to said compression means for compressing same on picking up weight of said pipe on said elevator, a spring loaded latching means arranged between said shoulders normally holding said compression means under compression, and a trigger arranged on said body member normally urged in inoperative relationship to said latching means for releasing said latching means and adapted to trip said latching means on contact of said trigger with the periphery of said pipe.

7. In a pipe elevator embodying a pair of pivoted interconnected body members adapted to encircle, when closed, a projecting outer shoulder adjacently arranged on each of said body members, compression means arranged between the projecting outer shoulders on each of said body members normally urging said members into a closed position, a spring loaded pressure plate member arranged on one of said body members connected by a flexible member to said compression means for compressing same on picking up weight of said pipe on said elevator, a spring loaded latching means arranged between said shoulders normally holding said compression means under compression, a trigger arranged on said body member normally urged in inoperative relationship to said latching means for releasing said latching means and adapted to be urged into operative relationship to said latching means on contact of said trigger with the periphery of said pipe, said latching means comprising a generally L-shaped pivoted latch arm having a latch on one end engageable with said compression means and defining a recess and a finger on a second end, and said trigger being provided with a pivoted arm biased into co-operative relationship with said recess and adapted to contact the second end of said latch arm, said pivoted arm on said trigger being urged into compressive position by said finger to release said pivoted arm on said trigger from contact with said recess on said latch arm.

References Cited in the file of this patent
UNITED STATES PATENTS

| | | |
|---|---|---|
| 968,685 | Phillips et al. | Aug. 30, 1910 |
| 1,581,270 | Knisley | Apr. 20, 1926 |
| 2,009,942 | Moody | July 30, 1935 |